(12) United States Patent
Periot et al.

(10) Patent No.: US 9,987,930 B2
(45) Date of Patent: Jun. 5, 2018

(54) ELECTRIC RAILROAD NETWORK AND ASSOCIATED ENERGY EXCHANGE PROCESS

(71) Applicant: ALSTOM Transport Technologies, Levallois Perret (FR)

(72) Inventors: Robert Periot, Lamayou (FR); Jose Saiz, Aureilhan (FR); Dominique Jamet, Grusse (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 599 days.

(21) Appl. No.: 14/378,862

(22) PCT Filed: Mar. 5, 2013

(86) PCT No.: PCT/EP2013/054379
§ 371 (c)(1),
(2) Date: Aug. 14, 2014

(87) PCT Pub. No.: WO2013/131899
PCT Pub. Date: Sep. 12, 2013

(65) Prior Publication Data
US 2015/0008733 A1 Jan. 8, 2015

(30) Foreign Application Priority Data
Mar. 5, 2012 (FR) ...................... 12 51984

(51) Int. Cl.
*B60L 1/00* (2006.01)
*B60L 3/00* (2006.01)
(Continued)

(52) U.S. Cl.
CPC ............. *B60L 11/1801* (2013.01); *B60L 7/10* (2013.01); *B60L 7/14* (2013.01); *B60L 9/00* (2013.01);
(Continued)

(58) Field of Classification Search
CPC ........ G06Q 10/06; G06Q 10/00; G06Q 10/08; G06Q 10/10; B60L 1/00; B60L 15/32;
(Continued)

(56) References Cited

U.S. PATENT DOCUMENTS 6,129,025 A * 10/2000 Minakami ............... B60L 5/005
104/288
6,249,724 B1 * 6/2001 McCrary .............. G05D 1/0297
701/117
(Continued)

FOREIGN PATENT DOCUMENTS

DE 198 31 204 A1 1/2000

OTHER PUBLICATIONS

International Search Report for PCT/EP2013/054379 dated May 31, 2013.

*Primary Examiner* — Fritz M Fleming
*Assistant Examiner* — Jagdeep Dhillon
(74) *Attorney, Agent, or Firm* — Sughrue Mion, PLLC

(57) ABSTRACT

A railroad network (10) having a track (12), a network energy supply (14) and a plurality of trains (16) that are connectable to the network energy supply (14) via means (20) for connecting the train (16) to the network energy supply (14) and each have an internal energy storage system (24) for receiving and storing energy originating from said train (16) or from trains (16) of the railroad network (10) and for supplying energy to said train (16) or to trains (16) of the railroad network (10). Each train (16) is able to switch from an operational state in which it is able to move along the system of rails (12) and an idle state in which it is unable to move along the system of rails (12) and vice versa.
At least one of the trains (16) of the railroad network (10) is in the idle and energized state at the same time, its internal energy storage system (24) being connected to the network energy supply (14).

8 Claims, 1 Drawing Sheet

(51) Int. Cl.

| | | |
|---|---|---|
| *H02G 3/00* | (2006.01) | |
| *B60L 11/18* | (2006.01) | |
| *G05D 1/00* | (2006.01) | |
| *B61C 3/02* | (2006.01) | |
| *B61C 17/06* | (2006.01) | |
| *B60M 3/06* | (2006.01) | |
| *B60L 7/14* | (2006.01) | |
| *B60L 9/24* | (2006.01) | |
| *B60L 11/00* | (2006.01) | |
| *B60L 11/16* | (2006.01) | |
| *B60L 7/10* | (2006.01) | |
| *B60L 9/00* | (2006.01) | |

(52) U.S. Cl.
CPC ............... *B60L 9/24* (2013.01); *B60L 11/005* (2013.01); *B60L 11/16* (2013.01); *B60M 3/06* (2013.01); *B61C 3/02* (2013.01); *B61C 17/06* (2013.01); *G05D 1/00* (2013.01); *B60L 2200/26* (2013.01); *Y02T 10/7022* (2013.01); *Y02T 30/12* (2013.01); *Y02T 30/18* (2013.01)

(58) Field of Classification Search
CPC ........... G08G 9/00; G06F 19/00; G06F 17/00; G05D 1/00
USPC ........ 307/9.1, 10.1, 43, 64, 38, 39; 701/2, 1, 701/20, 19, 117, 123, 93; 705/7.12; 104/88.01, 88.02, 288, 18, 20
See application file for complete search history.

(56) References Cited

U.S. PATENT DOCUMENTS

| | | | | |
|---|---|---|---|---|
| 8,000,850 B2* | 8/2011 | Nasr | ...................... | A62C 27/00 180/65.1 |
| 8,538,611 B2* | 9/2013 | Kumar | ................ | B61L 27/0027 700/291 |
| 8,742,616 B1* | 6/2014 | Dehlsen | ................. | B61D 43/00 104/289 |
| 9,037,388 B2* | 5/2015 | McCrary | ................... | B60C 7/00 701/117 |
| 2006/0005739 A1* | 1/2006 | Kumar | ...................... | B60L 7/06 105/35 |
| 2006/0091832 A1* | 5/2006 | Donnelly | ................... | B60L 9/22 318/108 |
| 2008/0167767 A1* | 7/2008 | Brooks | .................... | B61L 3/006 701/20 |
| 2009/0187291 A1* | 7/2009 | Daum | ...................... | B61L 3/006 701/2 |
| 2009/0234521 A1* | 9/2009 | Kumar | ................ | B60L 11/1851 701/19 |
| 2009/0276108 A1* | 11/2009 | Kumar | .................... | B61L 23/00 701/20 |
| 2009/0309976 A1* | 12/2009 | Kumar | .................... | B61L 3/065 348/161 |
| 2010/0070172 A1* | 3/2010 | Kumar | .................. | B61L 23/041 701/408 |
| 2010/0090135 A1* | 4/2010 | Kumar | .................... | B61L 23/041 250/566 |
| 2011/0045947 A1* | 2/2011 | Kaltenbach | ............... | B60K 6/48 477/5 |
| 2011/0100735 A1* | 5/2011 | Flett | ......................... | B60K 6/46 180/65.22 |
| 2011/0316333 A1* | 12/2011 | Still | ........................ | B60L 1/003 307/9.1 |
| 2012/0290185 A1* | 11/2012 | Cooper | ................ | B61L 27/0027 701/93 |
| 2013/0006451 A1* | 1/2013 | Cooper | .................... | B61L 3/006 701/19 |
| 2013/0116865 A1* | 5/2013 | Cooper | .................... | B61L 17/00 701/20 |
| 2013/0131968 A1* | 5/2013 | Wills | ....................... | G08G 9/00 701/117 |
| 2013/0144467 A1* | 6/2013 | Kickbusch | .............. | B61L 3/006 701/2 |
| 2013/0173083 A1* | 7/2013 | Cooper | .................... | B61L 3/006 701/1 |
| 2014/0129061 A1* | 5/2014 | Cooper | ............... | B61L 15/0036 701/19 |

* cited by examiner

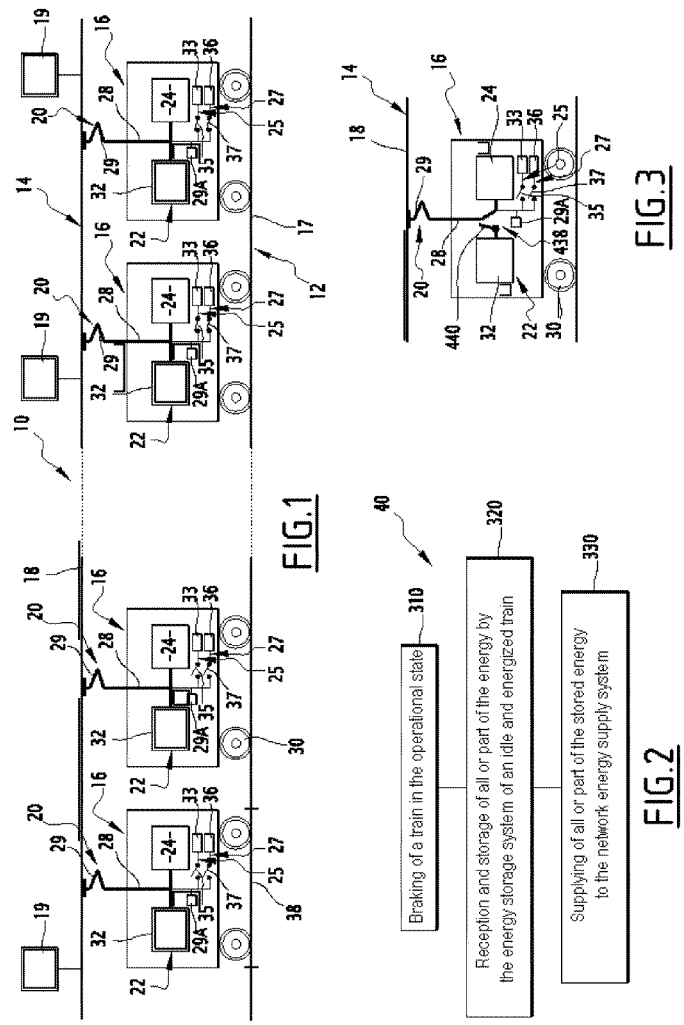

ELECTRIC RAILROAD NETWORK AND ASSOCIATED ENERGY EXCHANGE PROCESS

CROSS REFERENCE TO RELATED APPLICATIONS

This application is a National Stage of International Application No. PCT/EP2013/054379 filed Mar. 5, 2013, claiming priority based on French Patent Application No. 1251984 filed Mar. 5, 2012, the contents of all of which are incorporated herein by reference in their entirety.

The present invention relates to an electric railroad network.

More particularly, the invention relates to a railroad network of the type having:
- a track,
- a network energy supply, and
- a plurality of trains, each train having:
  - propulsion means able to generate electric energy by braking,
  - an internal electric energy storage system designed to store electric energy originating from the propulsion means of said train and from the network energy supply and to supply electric energy to said train and to said supply,
  - a set of ancillary equipment, and
  - means for connecting the train to the network energy supply, each train being energized when it is connected to the network energy supply via the connecting means, its internal electric energy storage system then being connected to said supply, and powered down when it is not connected thereto, each train being able to switch between an operational state in which its set of ancillary equipment is connected to the network energy supply or to the internal electric energy storage system of said train and the train is able to move along the track, and an idle state in which said set of ancillary equipment is disconnected from the network energy supply and the internal electric energy storage system and the train is unable to move along the track.

The field of the invention is in the field of electric railroad networks, and more particularly in the field of regenerative braking.

Historically, the braking of electric trains was carried out in the braking system thereof by dissipation of their kinetic energy as heat. Thus, all of the kinetic energy dissipated was lost.

In the current context of reducing energy consumption in the field of transport, some trains will henceforth be equipped with an internal energy storage system intended in particular to store, in the form of electric energy, a part of the kinetic energy dissipated during braking. The electric energy stored is then reused by the same train for its propulsion or in order to supply the electric equipment thereof, or else is sent back to the network energy supply, bound for other operational and energized trains in order for them to operate.

As is known, this process of energy exchange via the internal energy storage systems of trains of a railroad network has a number of drawbacks.

Specifically the energy storage sources with which the trains are equipped have a limited storage capacity.

Furthermore, the railroad network supply system is not always able to absorb the electric energy generated by the braking of the trains, for example when no train connected to the network supply requires energy.

Accordingly, if the energy storage source of the train is full, and the supply cannot absorb the electric energy generated, all of the electric energy generated during braking of this train has to be dissipated in the form of heat—via a rheostatic braking device, for example—and is lost in its entirety.

In order to respond to these problems, the solution known to a person skilled in the art is to increase the network energy storage capacity.

To this end, one way of proceeding consists in modifying substations connected to the railroad network supply in order to make them reversible and/or able to store a part of the electric energy generated by the operational trains.

Another way of proceeding consists in adding additional fixed reversible electric energy storage systems to the network supply. These are for example disposed along the tracks.

However, these solutions are not entirely satisfactory.

Specifically, the modifications that have to be made to the substations of the network supply system to make them reversible have a high cost. The addition of new storage sources to the network is also very expensive.

Therefore, one of the objects of the invention is to obtain a railroad network that has improved storage capacities for the electric energy generated by the operational trains for a significantly lower cost.

To this end, the invention relates to a network of the abovementioned type, wherein at least one of the trains is in the idle and energized state at the same time, its internal electric energy storage system being connected to the network energy supply.

The network according to the invention may comprise one or more of the following features, considered in isolation or in any technically feasible combination:
- once a plurality of trains of the railroad network are in the operational state, the percentage of trains of the railroad network that are in the idle and energized state at the same time is between 1% and 10%, and is in particular 10%.
- during peak hours of the railroad network, the percentage of trains of the railroad network that are in the idle and energized state at the same time is between 1% and 10%, and is in particular 5%.
- during off-peak hours of the network, the percentage of trains of the railroad network that are in the idle and energized state at the same time is between 5% and 10%, and is in particular 10%.
- the network comprises at least one long-term parking location chosen from the following group: a shop, a maintenance site, a parking area, a garage, a depot, a station, and the or each train that is in the idle and energized state at the same time is located in said at least one long-term parking location.
- the means for connecting at least one of the trains comprise a controllable switch able to disconnect the propulsion means from the network energy supply and its internal electric energy storage system when said train is energized and in the idle state.
- the set of ancillary equipment of each train comprises an ancillary controllable switch able to connect said set of ancillary equipment to the network energy supply and/or to the internal electric energy storage system, on the one hand, and to disconnect said set of ancillary equipment from the network energy supply and from the internal electric energy storage system, on the other hand.

A further subject of the invention is an energy exchange process within a railroad network as defined above, each train of the network being:
- energized when it is connected to the network energy supply via the connecting means, its internal electric energy storage system being connected to said supply,
- powered down when it is not connected to the network energy supply via the connecting means, its internal electric energy storage system not being connected to said supply,
- in the operational state when its set of ancillary equipment is connected to the network energy supply or to its internal electric energy storage system and the train is able to move along the track, its propulsion means being able to generate electric energy by braking,
- in the idle state when its set of ancillary equipment is disconnected from the network energy supply and from its internal electric energy storage system and the train is unable to move along the track, the energy exchange process comprising:
- a step of braking of a train in the operational and energized state,
- a step of storing all of part of the electric energy resulting from the braking of said train in the internal electric energy storage system of one or more trains that are in the idle and energized state,
- a step of supplying, via the network energy supply, all or part of the energy stored in the internal electric energy storage system of the or each train that is in the idle and energized state at the same time to one or more other trains of the railroad network that are in the operational state.

The invention will be better understood from reading the following description, given solely by way of example and made with reference to the appended drawings, in which:

FIG. 1 is a schematic representation of a railroad network according to the invention;

FIG. 2 is a block diagram showing an energy exchange process between trains of the railroad network from FIG. 1; and FIG. 3 is schematic representation of a train of a railroad network according to a variant of the invention.

Throughout the following text, the term "train" is used to designate either a train, a streetcar, a subway train or any other electric self-propelled element. In addition, the terms "right" and "left" are used with reference to the figures and not in a limiting manner.

With reference to FIG. 1, the railroad network 10 according to the invention comprises a track 12, a network energy supply 14 and a plurality of trains 16.

The track 12 comprises rails 17 disposed in parallel pairs for the trains 16 to travel on.

The network energy supply 14, known as "supply 14" in the following text, is able to supply the trains 16 of the railroad network 10 with electric energy necessary for them to operate, for example for their propulsion or for supplying onboard equipment (lighting, air conditioning, etc.).

The supply 14 comprises energy sources (not shown), one or more overhead lines 18 and fixed reversible energy storage systems 19.

The overhead lines 18 are able to allow the electric connection of each of the trains 16 between one another and to the energy sources of the supply 14.

To this end, an overhead line 18 is disposed above the track 12.

Fixed reversible electric energy storage systems 19 are disposed along the tracks. They are connected to the overhead lines 18 and are able to store electric energy originating from the supply 14 and to restore the stored electric energy to the supply 14. Such fixed reversible electric energy storage systems 19 are known to a person skilled in the art.

Still with reference to FIG. 1, each train 16 has means 20 for connecting to the supply 14, propulsion means 22 and an internal electric energy storage system 24. Furthermore, each train 16 comprises a set of ancillary equipment 25 and also a set of low-voltage ancillary equipment 27, hereinafter known as "ancillary system 25" and "low-voltage system 27", respectively, and described in detail below.

The connecting means 20 of each train 16 are able to allow the bidirectional transfer of energy between the supply 14 and the various elements of the train 16.

To this end, in a known manner, these connecting means 20 comprise electrically conductive cables 28, at least one pantograph 29 fixed to the roof of the train 16 and means 29A for actuating the or each pantograph 29.

The or each pantograph 29 is deployable via the actuating means 29A between a position folded back on the train 16 and spaced apart from the overhead line 18 and a deployed position in which it is in contact with the overhead line 18.

The cables 28 are able to connect the propulsion means 22, the internal energy storage system 24, the ancillary system 25, the low-voltage system 27, the or each pantograph 29 and the actuating means 29A together and to the supply 14, as illustrated in FIG. 1.

Each train 16 is thus:
- energized when it is connected to the supply 14, its pantograph or pantographs 29 being in the deployed position, the internal electric energy storage system 24 then at least being connected to the supply 14 via the connecting means 20, or
- powered down when it is not connected to the supply 14, the pantograph 29 being in the folded position, the propulsion means 22 and the internal electric energy storage system 24 then not being connected to the supply 14.

The actuating means 29A comprise a compressor supplied by a battery and a pneumatic cylinder (these not being shown).

Alternatively, the actuating means 29A comprise an electric motor supplied by a battery or a pneumatic cylinder supplied by an air supply of the train 16.

The actuating means 29A are able to ensure the deployment of the pantograph 29, for example following long-term parking of the train 16, and in a way independent of the other components of the train 16, it being possible for the battery that they comprise to be recharged with electric energy via the supply 14 once the or each pantograph 29 is in the deployed position.

The propulsion means 22 of the train 16 are able to convert the electric energy that they receive into kinetic energy during acceleration phases and to convert the kinetic energy of the train 16 into electric energy during braking phases. The electric energy received by the propulsion means 22 originates from the supply 14 or from the internal electric energy storage system 24 of the train 16, as will be seen below.

To this end, the propulsion means 22 comprise wheels 30 that engage with the track 12 and also a reversible motor unit 32 connected to the wheels 30.

The reversible motor unit 32 is able to actuate the wheels 30 when it is supplied with electric energy, or else to brake the wheels 30 by generating a braking torque applied to the wheels 30 and by supplying electric energy. All or part of this electric energy is then sent to the internal electric energy storage system 24 of the train 16 or else sent through the supply 14 via the connecting means 20.

The internal electric energy storage system 24 of the train 16 is able to receive and store the electric energy originating from the propulsion means 22 or originating from the supply 14. Moreover, the internal electric energy storage system 24 is able to restore the stored energy to the propulsion means 22, to the supply 14 and to the ancillary system 25 and the low-voltage system 27.

To this end, the internal electric energy storage system 24 is connected to the propulsion means 22 and to the ancillary system 25 and low-voltage system 27 and is connectable to the supply 14 and to the other trains 16 via the connecting means 20.

In a known manner, the internal electric energy storage system 24 comprises for example one or more flywheels, one or more power batteries and/or one or more supercapacitor assemblies (these not being shown).

The ancillary system 25 is designed to allow the material preparation of the train 16 together with the low-voltage system 27, that is to say to make the train able to move along the track 12 and to receive passengers, as will be seen below.

The ancillary system 25 comprises ancillary equipment and an ancillary controllable switch 35 arranged between the electric cables 28 and the ancillary equipment 33.

The ancillary equipment 33 comprises material or electric systems that are necessary for the movement of the train 16. It comprises for example braking circuits for the wheels 30, diagnostic circuits of the propulsion means 22, control circuits, electronic circuits for controlling propulsion and security, for communication, for controlling a main circuit breaker of the train, for ventilation and for emergency lighting.

The ancillary controllable switch 35 is able:
in the closed position to connect the ancillary equipment 33 to the internal electric energy storage system 24 on the one hand, and on the other hand to the supply 14 if the train 16 is energized, and
in the open position to disconnect the ancillary equipment 33 from the supply 14 and from the internal electric energy storage system 24.

The low-voltage system 27 is able to allow the material preparation of the train 16 together with the ancillary system 25, as will be seen below.

The low-voltage system 27 comprises low-voltage equipment 36 and a low-voltage controllable switch 37 arranged between the electric cables 28 and the low-voltage equipment 36.

The low-voltage equipment 36 comprises systems that are necessary for making the train suitable for the presence of passengers. It comprises for example a lighting system for the train 16, an air conditioning system for the train, a system for safe control of the doors of the train 16, for ventilation and for displaying information, for battery charging and for air supply.

The low-voltage controllable switch 27 is able:
in the closed position to connect the low-voltage equipment 36 to the internal electric energy storage system 24 on the one hand, and on the other hand to the supply 14 if the train 16 is energized, and
in the open position to disconnect the low-voltage equipment 36 from the supply 14 and from the internal electric energy storage system 24.

Connecting and maintaining the connection of the ancillary system 25 and low-voltage system 27 to the supply 14 and/or to the internal electric energy storage system 24 by setting their respective controllable switch 35, 37 into the closed position is necessary to make the train 16 able to move along the track and to receive passengers.

It should be noted that, inasmuch as the ancillary equipment 33 comprises the control circuits of the propulsion means 22, keeping the ancillary controllable switch 35 in the open position suffices to make the train unable to move.

Each train 16 is able to switch between an "idle" state and an "operational" state and vice versa.

In the idle state, the ancillary system 25 and the low-voltage system 27 are disconnected from the supply 14 and from the internal electric energy storage system 24 by setting their respective controllable switches 35, 37 into the open position.

Thus, in this idle state, the train 16 is unable to move along the track 12 and is unable to receive passengers.

By contrast, in the operational state, the ancillary system 25 and the low-voltage system 27 are kept connected to the supply 14 and/or to the internal electric energy storage system. The train 16 is thus able to move along the track 12 and to receive passengers and its propulsion means 22 are able to generate electric energy by braking.

In a known manner, the switching of a train 16 from an idle state into an operational state bears the name of material preparation.

During this material preparation, the respective controllable switches 35, 37 of the ancillary system 25 and the low-voltage system 27 are set into the closed position, these systems 25, 27 then being connected on the one hand to the internal electric energy storage system 24 and, on the other hand, to the supply 14 if the train 16 is energized.

The train 16 is thus energized during the material preparation.

This material preparation generally lasts longer than a few minutes, during which all of the circuits supplied by the battery of the train 16 are energized, including the electronic control circuits of the propulsion and self-diagnostic means 22.

When all of the conditions have been met, a sequence of precharging and engaging the main circuit breaker of the train 16 is started.

In the case of trains 16 equipped with pneumatic circuits, a compressor of the train 16 charges an air supply. An immobilization brake of the train 16 can thus only be disengaged once the pressure of the air supply is sufficient to ensure braking and proper functioning of the train suspension systems.

At the end of the material preparation of the train 16, the latter is in the operational and energized state and is able to move along the track 12 and to receive passengers.

Furthermore, it is then able to switch almost instantaneously from being in a stationary position (for example during a commercial stop at a station for passengers to board and alight) to moving along the track 12.

The switching of a train 16 from an operational state to an idle state bears the name of material depreparation.

During material depreparation, the controllable switches 35, 37 of the ancillary system 25 and low-voltage system 27 are set into the open position.

Accordingly, the ancillary equipment 33 and low-voltage equipment 36 are rendered idle and the train 16 becomes unsuitable for the presence of passengers and unable to move along the track 12.

The powering down of the train 16 is thus carried out during material depreparation.

For the purposes of material depreparation of a train 16, the train 16 is moved to a long-term parking location 38 of the railroad network 10, such as a shop, a maintenance site, a parking area, a garage, a depot, a station, etc.

Once material depreparation of the train 16 has been achieved, the train is in an idle and powered-down state and is thus completely unable to move along the track 12 and to receive passengers until its material preparation has been carried out again.

In a railroad network 10 according to the invention, at least one train 16 which is in the idle state is specifically kept energized without its material preparation having taken place, such that its internal energy storage system 24 is connected to the supply 14 while the train 16 remains unable to move along the track.

In practice, in order to do this, the circuits relating to the operation and diagnostics of the internal energy storage system 24 of the train 16 are energized selectively.

In the example in FIG. 1, the two left-hand trains in this figure are in the idle and energized state at the same time. By contrast, the two right-hand trains in the same FIG. 1 are in the operational and energized state.

The internal electric energy storage systems 24 of the trains 16 in the idle and energized state are able to receive and store energy originating from the supply 14 and to send this energy back through the supply 14.

Once a plurality of trains 16 are in the operational state, the percentage of trains 16 of the network 10 that are in the idle and energized state at the same time is between 1% and 10%, and is in particular 10%.

It should be noted that when no train 16 is in the operational state, it is advantageous not to keep any train 16 in the idle and energized state. This is the case for example when no passengers are using the trains 16, which is generally the case at night.

Advantageously, the percentage of trains 16 in the idle and energized state is determined in relation to a number of criteria, for example the number of people using the railroad network 10.

Thus, during what is known as a "peak" hour, there are statistically always enough trains 16 in the operational state to consume the braking electric energy generated by the trains 16.

By contrast, during off-peak hours, the probability that a train 16 will be a consumer of electric energy while another train 16 is a supplier decreases.

Thus, during peak hours, the need for trains 16 in the idle and energized state on the railroad network 10 is lower than what are known as "off-peak" hours of the network 10.

During peak hours of the network 10, the percentage of trains 16 in the idle and energized state at the same time is between 1% and 10%, and is in particular 5%.

During off-peak hours of the network 10, the number of trains 16 in the idle and energized state at the same time is between 5% and 10%, and is in particular 10%.

The functioning of a railroad network 10 according to the invention and the process 40 of transferring energy between the trains 16 of this railroad network 10 will now be described, in particular with reference to FIGS. 1 and 2.

In the railroad network 10, when a train 16 in the operational state brakes during a braking step 310, all or part of the energy generated by the reversible motor unit 32 of the train 16 is sent toward its internal electric energy storage system 24 and/or to the supply 14.

The criteria determining the destination of the electric energy generated during braking are known to a person skilled in the art and comprise in particular the impedance of the overhead lines 18—causing dissipation of energy as it passes along the supply 14. A strong impedance, which results for example from the dilapidation of the overhead lines 18, is undesirable, and the energy generated during braking of the train 16 will thus preferably be stored in the internal electric energy storage system 24 of the train 16.

The electric energy generated during the braking step 310 of the train 16 and supplied to the supply 14 is thus collected:

by the propulsion means 22 and/or the ancillary system 25 and low-voltage system 27 of one or more other trains 16 of the network 10 that are in the operational state, in order for them to operate, or by the internal electric energy storage system 24 of the train 16 or of these trains 16 for storage, and/or by one or more fixed reversible energy storage systems 19, and/or by the internal electric energy storage system 24 of one or more trains 16 that are idle and energized at the same time during a storage step 320, the internal electric energy storage system 24 of the train or of each of these trains 16 then always being connected to the supply 14.

During a supplying step 330, all or part of the electric energy stored during the storage step 320 in the internal electric energy storage system 24 of the or of each train 16 which is idle and energized at the same time is sent back via the supply 14 toward a train 16 in the operational and energized state in order for it to operate, as described above.

The railroad network 10 according to the invention thus makes it possible to have additional electric energy storage systems without having to physically add new independent storage systems along the track 12 and without having to modify the preexisting electric energy storage systems.

The costs associated with increasing the storage capacity for electric energy resulting from regenerative braking in the railroad network 10 according to the invention are thus considerably reduced.

Furthermore, since the amount of electric energy passing through the supply 14 and originating from the regenerative braking of the trains 16 is increased, the electric energy that has to be supplied by the supply sources and also the current and voltage peaks in the overhead lines 18 are correspondingly decreased.

More particularly, the railroad network 10 according to the invention allows a particularly tangible improvement of the energy balance of the railroad network 10 during hours in which fewer people use the network, as indicated above.

Finally, and in a known manner, the fixed reversible substations 19 are expensive devices which can only restore a current of sufficient quality in terms of harmonic content to the supply 14 if bulky and expensive filtering devices are provided, unlike internal energy storage systems installed on the trains, which restore a current of good quality which requires few transformations before it can be used.

The storage of electric energy in the internal electric energy storage systems 24 of the trains 16 rather than in the fixed reversible substations 19 thus makes it possible to improve the quality of electric energy flowing through the supply 14.

In a variant (not shown), the supply 14 comprises one or more supply rails instead of the overhead line or lines 18.

Such rails are disposed on the ground parallel to the track 12.

In a variant, with reference to FIG. 3, the connecting means 20 of at least one train 16 comprise a device 438 that is able to prevent the connection of the propulsion means 22 to the supply 14 when the train is energized and its internal electric energy storage system 24 is itself connected to the supply 14.

To this end, the device 438 comprises a controllable switch 440 arranged between the electric cables 28 and the propulsion means 22 and able to disconnect the propulsion means 22 from the supply 14 and from the internal electric energy storage system 24 when the train 16 is energized and in the idle state.

This variant is advantageously used to minimize the number of energized components of the trains 16 in the idle state which are then energized. This makes it possible more particularly to keep the propulsion means 22 of an energized train 16 powered down, this possibly being necessary in order to carry out maintenance on the propulsion means 22, for example, while keeping the internal electric energy storage system 24 of the train connected to the supply 14 in order to receive, store and supply energy to the trains 16 on the railroad network 10 that are in the operational state.

In a variant, a train 16 in the idle state is successively energized and powered down, or vice versa, for periods of time determined depending on the storage capacity of electric energy required in the railroad network 10.

The idle train 16 will thus be powered down when the storage capacity of its internal electric energy storage system 24 is not required, and energized when this proves necessary to store the energy resulting from the braking of the operational trains 16.

The invention claimed is:

1. A railroad network comprising:
   a track,
   a network energy supply, and
   a plurality of trains, each train comprising:
   a plurality of vehicles,
   a propulsion unit able to generate electric energy by braking,
   an internal electric energy storage system designed to store electric energy originating from the propulsion unit of the train and from the network energy supply, and to supply electric energy to the train and to the network energy supply,
   a set of ancillary equipment, and
   a connector connecting the train to the network energy supply, the train being energized when the train is connected to the network energy supply via the connector, the internal electric energy storage system of the train being connected to the network energy supply, and powered down when the train is not connected the network energy supply, the train being able to switch between an operational state in which the set of ancillary equipment of the train is connected to the network energy supply or to the internal electric energy storage system of the train and the train is configured for moving along the track, and an idle state in which the set of ancillary equipment of the train is disconnected from the network energy supply and the internal electric energy storage system and the train is unable to move along the track,
   wherein one or more trains are in the idle state and energized at the same time, the internal electric energy storage system of the one or more trains in the idle state and energized at the same time being connected to the network energy supply,
   one or more trains being in the operational state, the one or more trains in the operational state being distinct from the one or more trains in the idle state and energized,
   the one or more trains in the idle state and energized being configured for storing all or part of the electric energy generated by the one or more trains in the operational state in the internal electric energy storages system of the one or more trains in the idle state and energized,
   all or part of the electric energy generated by the one or more trains in operational state being transferred via the network energy supply,
   the one or more trains in the idle state and energized being configured for supplying, via the network energy supply, all or more part of the electric energy stored in the internal electric energy storage system to the one or more trains in the operational state.

2. The railroad network according to claim 1, wherein, once a plurality of trains of the railroad network are in the operational state, the percentage of trains of the railroad network that are in the idle state and energized at the same time is between 1% and 10%, and is in particular 10%.

3. The railroad network according to claim 1, wherein, during peak hours of the railroad network, the percentage of trains of the railroad network that are in the idle state and energized at the same time is between 1% and 10%, and is in particular 5%.

4. The railroad network according to claim 1, wherein, during off-peak hours of the railroad network, the percentage of trains of the railroad network that are in the idle state and energized at the same time is between 5% and 10%, and is in particular 10%.

5. The railroad network according to claim 1, wherein the railroad network comprises at least one long-term parking location, the at least one long-term parking location comprising a shop, a maintenance site, a parking area, a garage, a depot, and a station, and
   wherein the one or more trains that are in the idle state and energized at the same time are located in the at least one long-term parking location.

6. The railroad network according to claim 1, wherein the connector connecting the train to the network energy supply comprises a controllable switch able to disconnect the propulsion unit from the network energy supply and the internal electric energy storage system when the train is energized and in the idle state.

7. The railroad network according to claim 1, wherein the set of ancillary equipment of each train comprises an ancillary controllable switch able to:
   connect the set of ancillary equipment to at least one of the network energy supply and the internal electric energy storage system, and
   disconnect the set of ancillary equipment from the network energy supply and from the internal electric energy storage system.

8. An energy exchange process on the railroad network according to claim 1, each train comprising a plurality of vehicles, train of the railroad network being:
   energized when the train is connected to the network energy supply via the connector, the internal electric energy storage system of the train being connected to the network energy supply,
   powered down when the train is not connected to the network energy supply via the connector, the internal electric energy storage system of the train not being connected to the network energy supply,
   in the operational state when the set of ancillary equipment of the train is connected to the network energy supply or to the internal electric energy storage system of the train and the train is configured for moving along the track, the propulsion unit of the train being able to generate electric energy by braking,
   in the idle state when the set of ancillary equipment of the train is disconnected from the network energy supply and from the internal electric energy storage system of the train and the train is unable to move along the track, the energy exchange process comprising:

a first step of braking of a train in the operational state and energized, a second step of storing all or part of the electric energy resulting from the braking of said train in the operational state and energized in the internal electric energy storage system of one or more trains that are in the idle state and energized, the train in the operational state being distinct from the one or more trains in the idle state and energized, a third step of supplying, via the network energy supply, all or part of the electric energy stored in the internal electric energy storage system of the one or more trains in the idle state and energized at the same time to the one or more trains in the operational state.

* * * * *